US011131786B2

(12) United States Patent
Chen

(10) Patent No.: US 11,131,786 B2
(45) Date of Patent: Sep. 28, 2021

(54) SCANNER FOR DETECTING OBJECTS BEHIND AN OPAQUE SURFACE

(71) Applicant: Zircon Corporation, Campbell, CA (US)

(72) Inventor: Chien-Hsu Chen, Milbrae, CA (US)

(73) Assignee: Zircon Corporation, Campbell, CA (US)

( * ) Notice: Subject to any disclaimer, the term of this patent is extended or adjusted under 35 U.S.C. 154(b) by 70 days.

(21) Appl. No.: 16/587,523

(22) Filed: Sep. 30, 2019

(65) Prior Publication Data

US 2021/0096273 A1    Apr. 1, 2021

(51) Int. Cl.
*G01V 3/08* (2006.01)

(52) U.S. Cl.
CPC .................................. *G01V 3/088* (2013.01)

(58) Field of Classification Search
None
See application file for complete search history.

(56) References Cited

U.S. PATENT DOCUMENTS

| | | | |
|---|---|---|---|
| 4,992,741 A | 2/1991 | Douglas et al. | |
| 5,619,128 A | 4/1997 | Heger | |
| 6,259,241 B1 | 7/2001 | Krantz | |
| 6,933,712 B2 | 4/2005 | Miller et al. | |
| 7,812,722 B2 | 10/2010 | Krantz | |
| 2002/0171433 A1* | 11/2002 | Watanabe | G01R 15/16 324/539 |
| 2005/0200368 A1* | 9/2005 | Krantz | G01V 3/15 324/661 |
| 2006/0267598 A1* | 11/2006 | Morimoto | H01H 25/041 324/661 |
| 2008/0186010 A1 | 8/2008 | Skultety-Betz | |
| 2010/0225299 A1* | 9/2010 | Nguyen | G01R 19/15 324/67 |
| 2017/0074920 A1* | 3/2017 | Di Stefano | G01R 31/16 |

FOREIGN PATENT DOCUMENTS

WO    2018215761 A1    11/2018

OTHER PUBLICATIONS

International Search Report and Written Opinion dated Dec. 15, 2020, from PCT Application No. PCT/US2020/51941, filed Sep. 22, 2020.
Brian, "Conductive Rubber—What it is and Where It's Used." Datasheet, Majr Products Blog, Feb. 19, 2014.

* cited by examiner

*Primary Examiner* — Jas A Sanghera
(74) *Attorney, Agent, or Firm* — Silicon Valley Patent Group LLP; Thomas C. Chan

(57) ABSTRACT

Method and apparatus are provided for detecting objects behind an opaque surface. An exemplary device for detecting objects behind an opaque surface, comprising a housing configured to hold a plurality of components of the device, one or more sensors, coupled to the housing, configured to collect sensor data of an object behind the opaque surface, a controller, residing inside the housing, configured to process the sensor data collected by the one or more sensors, at least one printed circuit board, residing inside the housing, configured to hold the controller and the plurality of components of the device, and a display configured to convey information about a detected object to a user.

16 Claims, 9 Drawing Sheets

SCANNER FOR DETECTING OBJECTS BEHIND AN OPAQUE SURFACE

FIELD

The present invention relates to the field of scanners for detecting objects behind an opaque surface.

BACKGROUND

As an example, stud finders have been commonly used in construction and home improvement industries. FIG. 1 illustrates a cross-sectional view of a conventional scanner used as a stud finder. As shown in FIG. 1, a scanner 102 may be used in a construction and home improvement environment 100. For example, the scanner 102 may be configured to detect an object 101 behind an opaque surface 103. In some applications, the object 101 may be a stud or a metal pipe. The opaque surface 103 may be a wall covered with drywall, particle board, plywood, or other material that prevents visual identification of objects behind the opaque surface 103.

The scanner 102 may include a housing to enclose and protect various electronic components. For example, within the housing of the scanner 102, it may include a printed circuit board (PCB) 104, which can be configured to hold the various electronic components, such as capacitive sensor(s) 108, a metal sensor 109, a controller/processor and other integrated circuits (labelled as 106a and 106b). The PCB 104 may be coupled to a battery 107, which provides power to the scanner 102. As shown in FIG. 1, D1 represents a distance between the capacitive sensor(s) 108 to the object 101 to be detected. D2 represents a distance between the capacitive sensor(s) 108 and the metal sensor 109.

There are a few drawbacks associated with the conventional scanner. First, since the capacitive sensor(s) 108 are attached to the PCB 104 inside the housing, the distance from the object 101 (D1), and thus the sensitivity of the capacitive sensor(s) 108, may not be optimal because of the placement of the PCB 104. In addition, the accuracy of the capacitive sensor(s) 108 can also be reduced by possible displacement of the PCB 104, for example the PCB 104 can be displaced from its factory-set location if the scanner has been accidentally dropped. The scanner 102 may need to be recalibrated after such accidental drop that caused the PCB 104 to be displaced. Another drawback of the conventional scanner is the requirement of a separation such as over four inches between the capacitive sensor(s) 108 and the metal sensor 109 on the PCB. This is because the capacitive sensor(s) 108, formed with copper plates, can create electromagnetic interference with the metal sensors, and thus reduce the accuracy of metal detection by the scanner 102.

Therefore, there is a need for a scanner that can address the above drawbacks of the conventional scanner in detecting objects behind an opaque surface.

SUMMARY

Aspects of the present disclosure include, an exemplary device for detecting objects behind an opaque surface, comprising a housing configured to hold a plurality of components of the device, one or more sensors, coupled to the housing, configured to collect sensor data of an object behind the opaque surface, a controller, residing inside the housing, configured to process the sensor data collected by the one or more sensors, at least one printed circuit board, residing inside the housing, configured to hold the controller and the plurality of components of the device, and a display configured to convey information about a detected object to a user.

Aspects of the present disclosure include an exemplary method for detecting objects behind an opaque surface by a device, comprising providing a housing configured to hold a plurality of components of the device, wherein the device includes at least one printed circuit board, residing inside the housing, that is configured to hold a controller and the plurality of components of the device, collecting, by one or more sensors coupled to the housing, sensor data of an object behind the opaque surface, processing, by the controller residing inside the housing, sensor data collected by the one or more sensors, and conveying information about the object behind the opaque surface to a user on a display.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of the following drawings Like numbers are used throughout the disclosure.

DESCRIPTION OF EMBODIMENTS

Methods and apparatuses are provided for detecting objects behind an opaque surface. The following descriptions are presented to enable a person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the scope of the disclosure. Thus, the present disclosure is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary" or as an "example" is not necessarily to be construed as preferred or advantageous over other aspects or embodiments.

Some portions of the detailed description that follow are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 2:
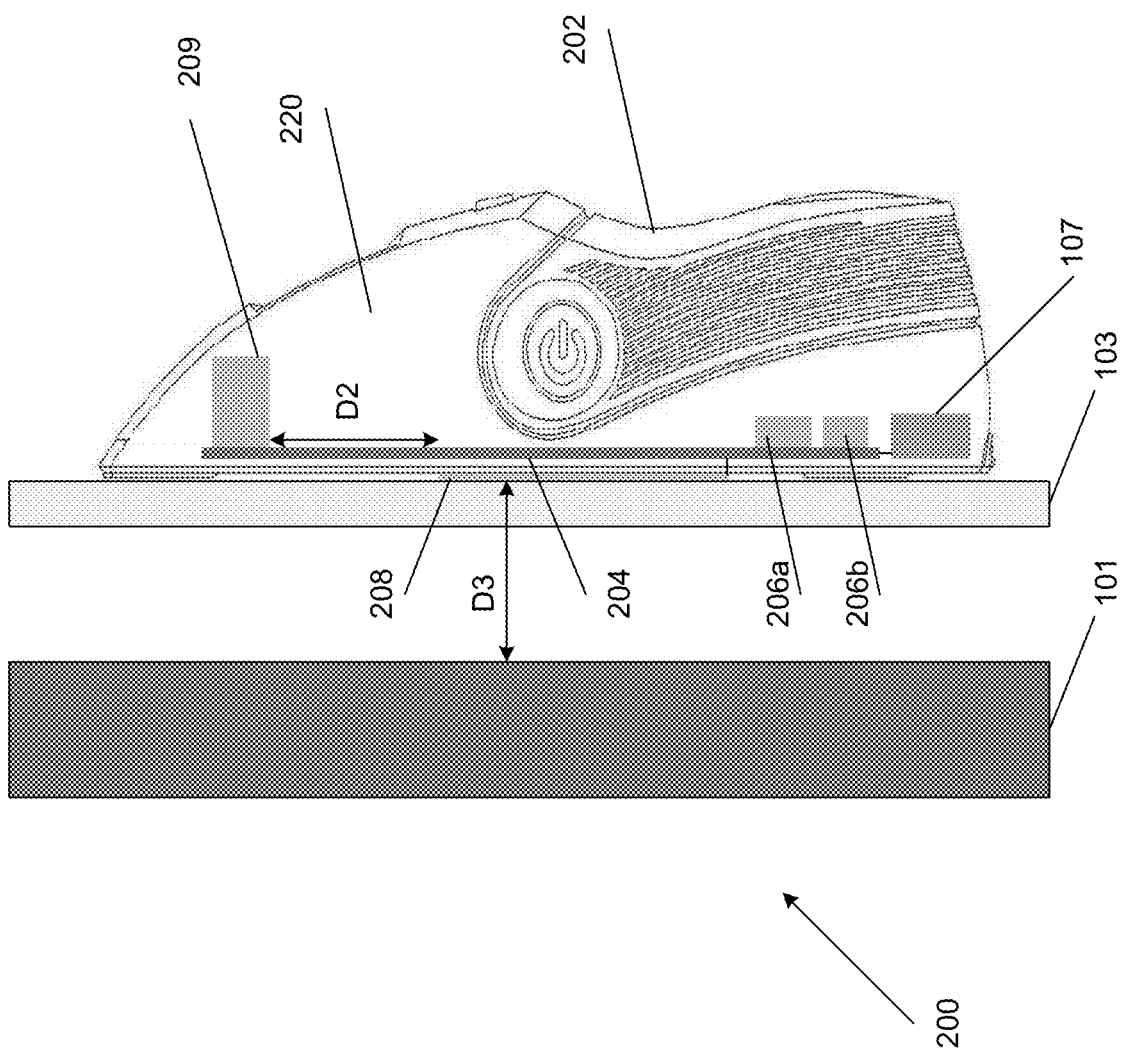
FIG. 2 illustrates a cross-sectional view of an exemplary implementation of a scanner for detecting objects behind an opaque surface according to aspects of the present disclosure.

FIG. 2 illustrates a cross-sectional view of an exemplary implementation of a scanner for detecting objects behind an opaque surface according to aspects of the present disclosure. In the example shown in FIG. 2, a scanner 202 may be used in a construction, home improvement, commercial, artistic, design or any applicable environment 200.

FIG. 2 illustrates a cross-sectional view of an exemplary embodiment of the present disclosure. For example, the scanner 202 may be configured to detect an object 101 behind an opaque surface 103. Object 101, for example, includes, but is not limited to metal and/or wood studs, metal objects, wooden objects, electrical wiring, electrical and/or other conduit, plumbing, and other imbedded or hidden liquids or solids behind an opaque surface 103, such as, for example, the installed drywall, sheetrock, particle board, plywood or wallboard forming a wall surface. In some applications, the object 101 may be a stud or a metal pipe.

The scanner 202 may include a housing 220 to enclose and protect various electronic components. For example, within the housing 220 of the scanner 202, one or more printed circuit board(s) (PCB) 204 may be included, which can be configured to hold the various electronic components, such as a sensor that detects change in capacitance 208 (hereinafter "capacitive sensor"), a metal sensor 209, a controller/a processor, or, alternatively, a controller may include a processor and other integrated circuits (labelled as 206a and 206b). The PCB 204 may be coupled to a battery 107, which provides power to the scanner 202. The capacitive sensor(s) 208 may be externally coupled to the housing 220 or, in other words, placed outside the housing 220 of the scanner 202. Alternatively, in another exemplary embodiment (not shown), the capacitive sensor(s) 208 may reside inside the housing 220 of the scanner 202. Alternatively, in another exemplary embodiment (not shown), the capacitive sensor(s) 208 may reside outside and/or inside the housing 220 of the scanner 202. With the change in placement of capacitive sensor(s) 208, D3 represents a distance between the capacitive sensor(s) 208 and the object 101 to be detected. D2 represents a distance between the capacitive sensor(s) 208 and the metal sensor 209. One benefit of the exemplary implementation of FIG. 2 is that the distance between the capacitive sensor(s) 208 and the object 101 to be detected has been shortened, which in turn improves the sensitivity and accuracy of the scanner 202 in detecting the object 101 behind the opaque surface 103.

According to aspects of the present disclosure, scanner 202 may be configured to detect changes in the dielectric constant of a wall. The dielectric constant changes when a sensor, such as capacitive sensor(s) 208, is over an object, for example, a stud. In some implementations, the scanner 202 may be configured to detect edges of a stud or other material or objects behind an opaque surface. In this approach, the scanner may first be calibrated over a section with an empty cavity behind the wall, and then it can be moved along the wall surface until it senses a change in capacitance—such as the edge of a stud. The scanner may be moved from both directions to find both edges of the stud. After both edges have been marked, the user may determine the location of the stud's center.

In some other implementations, the scanner 202 can be configured to detect the center of an object 101, for example, a stud by using two sensors that register separate readings of the wall's dielectric constant. When the two readings match, it is an indication that the scanner 202 is centered on a stud. Several readings may be used to determine the target center. In this approach, the scanner 202 may only need to be moved from one direction.

In yet some other implementations, the scanner 202, large in size, can be configured to have multiple sensor plates (not shown), and not need to be moved across the wall to detect a stud, overcoming the effects of bumpy wall texture. The scanner may use an algorithm to analyze the sensor data collected from the multiple sensor plates for an indication of different objects behind an opaque surface. In this approach, the scanner may be configured to sense the presence or absence of different objects, such as certain wooden stud, a nearby stud, or regions without studs, behind a wall surface. A display of the scanner may be configured to indicate or convey varied widths of studs and the location of multiple studs on a single image or any information that would be useful to the user. In using multiple readings to determine the location of studs, this approach may be less vulnerable to construction anomalies (such as uneven paint, wall textures, wallpaper, uneven plaster, etc.) that may disorient other approaches that are based simply on center and edge detection.

According to aspects of the present disclosure, the capacitive sensors 208 can be implemented using conductive rubber sensor(s). A conductive rubber sensor is a rubberized material with conductive properties, determined by the mix of the material, which may reduce or eliminate the electromagnetic interference and radio frequency interference (EMI/RFI) that is often associated with electronics. Some exemplary materials may be used to implement the conductive rubber sensor, such as, for example graphite in either sponge or solid silicone (aka conductive silicone) to act as a conductor to determine the capacitance of the materials behind the opaque surface.

In one exemplary embodiment, conductive rubber material can be provided in a wide range of configurations, thicknesses and widths to meet the various design criteria of a conductive rubber sensor, or the material may be die-cut or by injection molding, or any other method, to meet various configurations of the conductive rubber sensor. In one exemplary approach, the conductive rubber sensor can be made to have a thickness such that it touches the opaque surface during operation. In another approach, the conductive rubber sensor can be made to have a larger sensor area compared to the conventional copper plate sensors placed on a PCB residing inside the housing of the scanner.

Figure 3A:
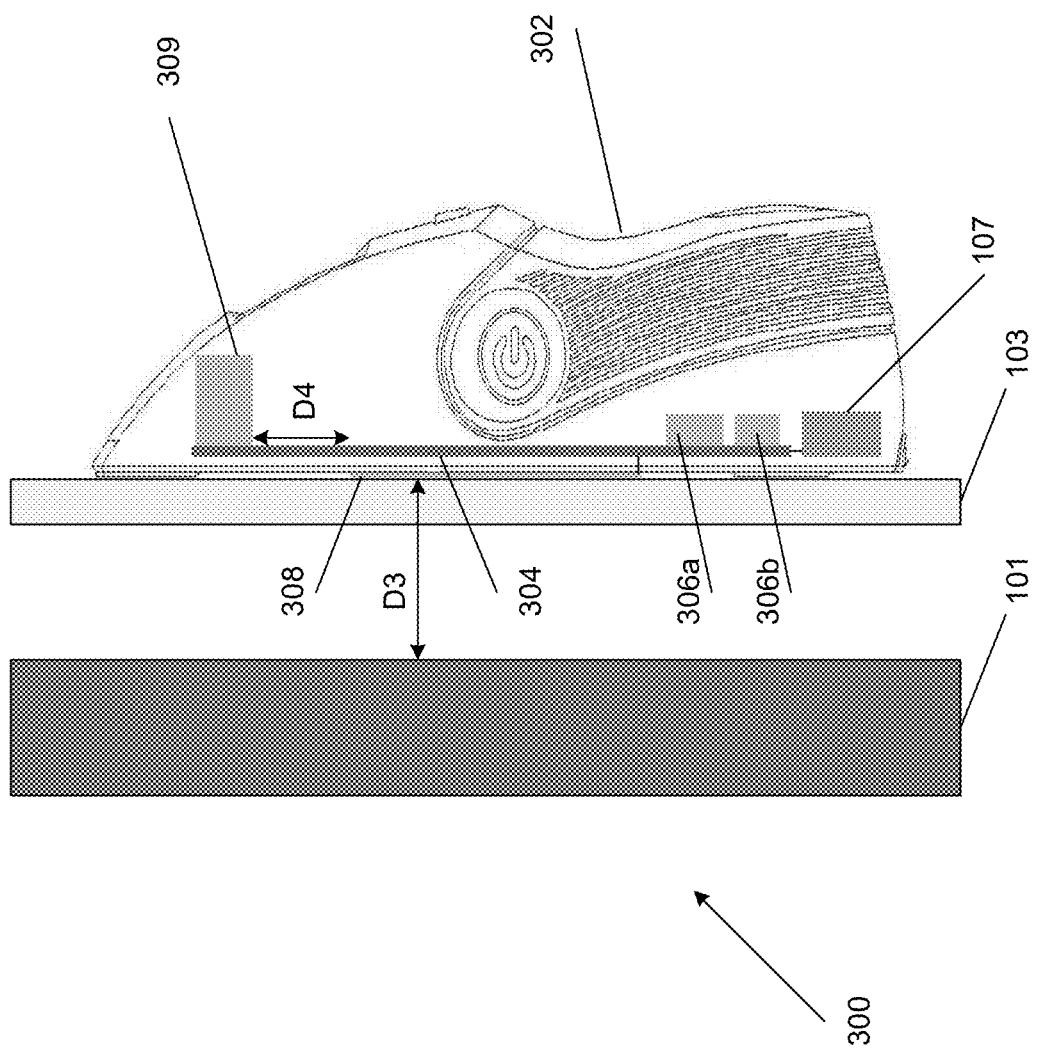
FIG. 3A illustrates a cross-sectional view of another exemplary implementation of a scanner for detecting objects behind an opaque surface according to aspects of the present disclosure.

FIG. 3A illustrates a cross-sectional view of another exemplary implementation of a scanner for detecting objects behind an opaque surface according to aspects of the present disclosure. In the exemplary implementation of FIG. 3A, certain elements of the environment 300 are similar to that of environment 200 of FIG. 2. For example, the object 101 and the opaque surface 103, and the battery 107 (the description of these elements is not repeated here).

The scanner 302 may include a housing to enclose and protect various electronic components. For example, in one exemplary embodiment, within the housing of the scanner 302, at least one printed circuit board (PCB) 304 may be included, which can be configured to hold the various electronic components, such as a metal sensor 309, a controller and other integrated circuits (labelled as 306a and 306b). The capacitive sensor(s) 308 may be placed outside and/or inside of the housing of the scanner 302. In the exemplary embodiment shown in FIG. 3A, capacitive sensor(s) 308 may be placed outside of the housing of the scanner 302. With the change in placement of capacitive sensor(s) 308, D3 represents a distance between the capacitive sensor(s) 308 to the object 101 to be detected. D4 represents a distance between the capacitive sensor(s) 308 and the metal sensor 309.

Figure 1:
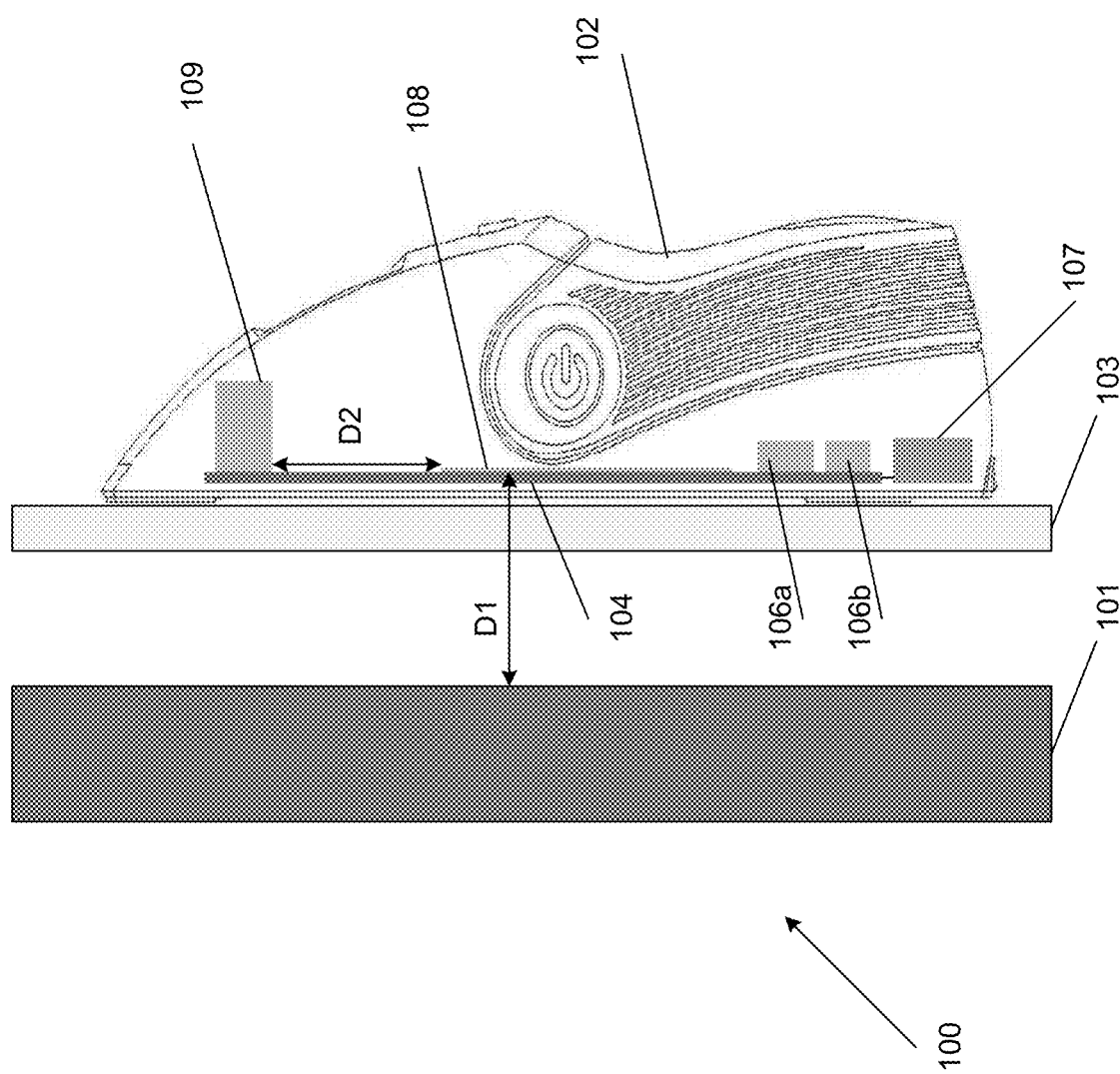
FIG. 1 illustrates a cross-sectional view of a conventional scanner.

Compared to the conventional implementation of FIG. 1, the implementation of FIG. 2, takes advantage of having the capacitive sensor(s) 308 being placed on the outside of the housing of the scanner 302, which frees up space on the PCB 304. In addition, by taking advantage of the properties of the conductive rubber sensor(s), which produce negligible interference with the metal sensor 309, the distance between the conductive rubber sensor(s) and the metal sensor 309 can be shortened to D4. As a result, the size of the PCB 304 and the size of the scanner 302 can be reduced, which in turn reduces the material cost of the scanner 302.

According to aspects of the present disclosure, conductive elastomer may be used to implement the described conductive rubber sensor. In one approach, a manufacturing process of injection molding can be used to form a capacitive sensor having a variety of different profiles. In another approach, conductive elastomer can be die-cut to form a capacitive sensor having a variety of different profiles. Common profile configurations of conductive elastomers may include round, square, and rectangular, for example.

In some implementations, the conductive rubber sensor can comprise compounds such as silicone, fluorosilicone, or ethylene propylene diene monomer (EPDM). The use of a specific rubber is based upon the properties unique to each and determined by the intended environment and application. For example, silicone can be used for general weather sealing and high temperatures up to 400 degrees Fahrenheit (F). Fluorosilicone can be used for applications where exposure to fuel, gasoline, and alcohols is present. EPDM can be used for applications where exposure to coolants, steam, or phosphate ester is present, or where supertropical bleach (STB) is used. After choosing a specific rubber suited for the intended environment, a conductive filler can be determined. In one exemplary embodiment, some of the conductive fillers used can be, conductive glass, graphite, and other nonmetallic conductive substances. In another embodiment, depending on the application and desired information sought, conductive fillers used can be silver aluminum, silver glass, silver copper, and nickel graphite and other metallic conductive substances.

Figure 3B:
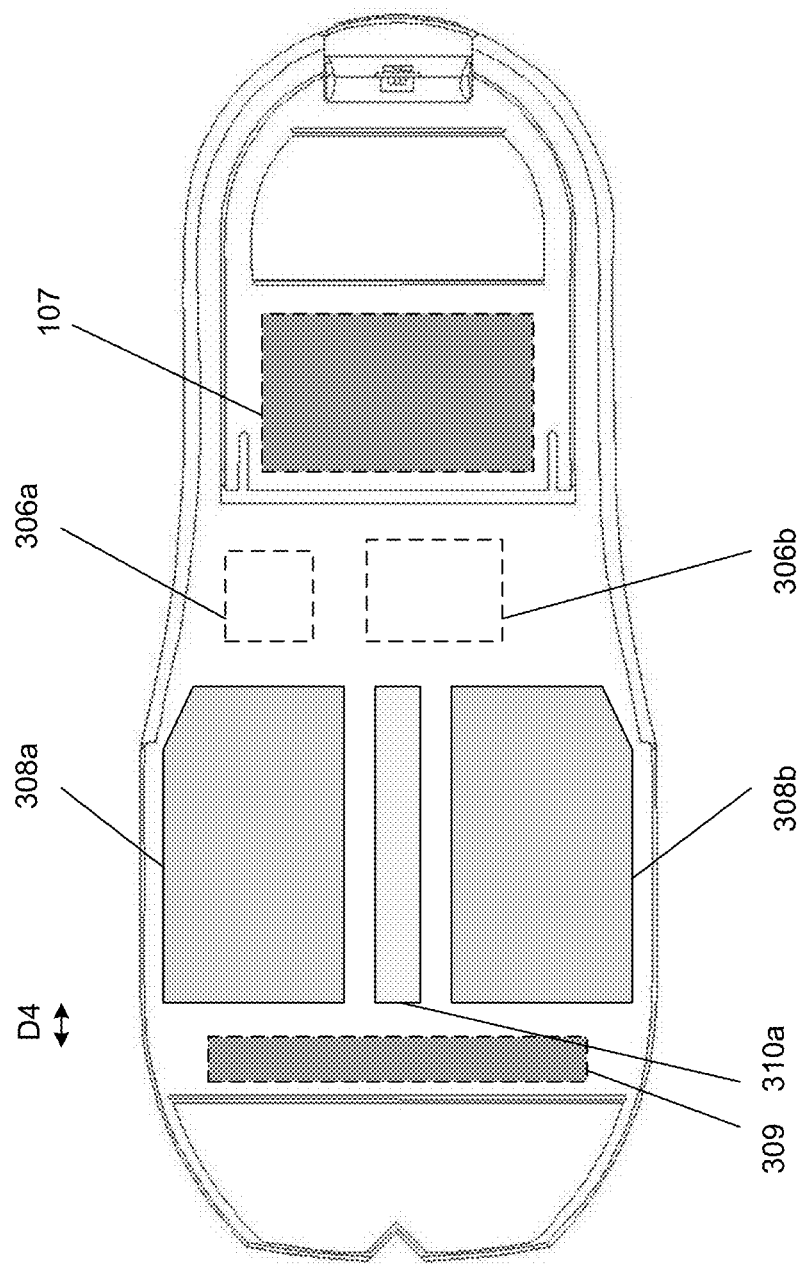
FIG. 3B illustrates a bottom view of the scanner of FIG. 3A according to aspects of the present disclosure.

FIG. 3B illustrates a bottom view of the scanner of FIG. 3A according to aspects of the present disclosure. As shown in FIG. 3B, items in solid lines represent objects in plain view from the bottom of the scanner 302, such as capacitive sensor(s) 308a and 308b, and an alternating current (AC) sensor 310a. Items in dotted lines represent objects inside the housing of the scanner 302, such as the metal sensor 309, the controller and other integrated circuits 306a and 306b, and the battery 107.

In some implementations, conductive ink may be used to implement a capacitive sensor of the present disclosure. Conductive ink may be created by infusing graphite or other conductive materials into ink, and then applying the ink to a printed object, such as a bottom surface of a scanner, to conduct electricity. Conductive ink can be an economical way to lay down a conductive area/traces when compared to traditional approaches such as etching copper from copper plated substrates to form the same conductive area/traces on a surface, as printing can be an additive process producing no waste streams that need to be recovered or treated as opposed to a typical PCB manufacturing process.

Figure 3C:
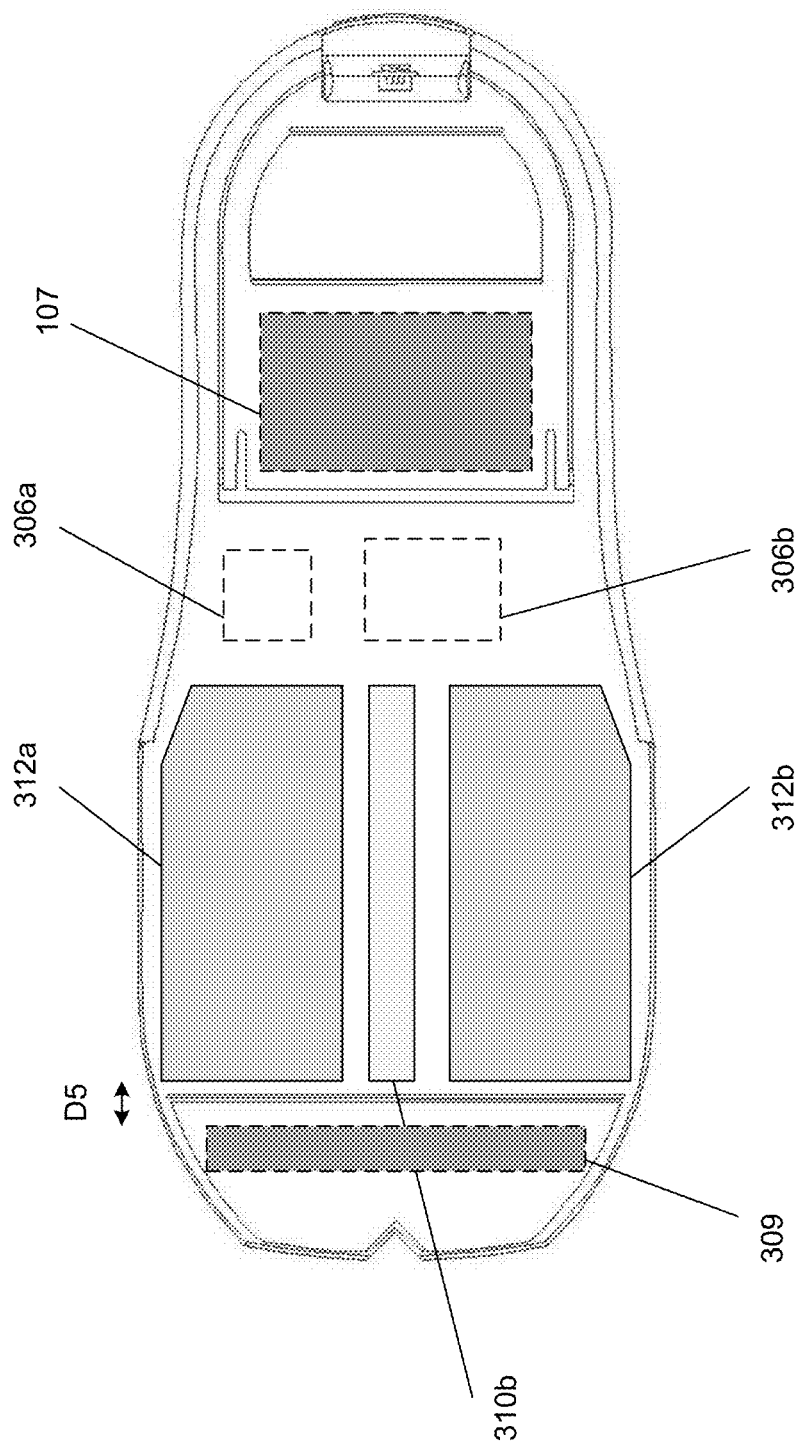
FIG. 3C illustrates another bottom view of an exemplary implementation of a scanner according to aspects of the present disclosure.

FIG. 3C illustrates another bottom view of an exemplary implementation of a scanner according to aspects of the present disclosure. As shown in FIG. 3C, certain elements shown in FIG. 3C are like the similar elements shown in FIG. 3B, thus the description of these elements is not repeated here. As discussed above, by taking advantage of the placement of the conductive rubber sensor(s) 312a and 312b on the outside of the housing of the scanner 302, the size of these sensors can be increased, shown as the increased sensor size from 308a and 308b in FIG. 3B to 312a and 312b in FIG. 3C. This increase in size of the sensors produces improved accuracy in detecting studs or other objects. In addition, by taking advantage of the properties of the conductive rubber sensor(s), which produce negligible interference with the metal sensor 309, the distance between the conductive rubber sensor(s) 312a and 312b as well as the distance from the AC sensor 310b, to the metal sensor 309, can be shortened to D5. As a result, the size and sensitivity of the conductive rubber sensor(s) 312a and 312b can be increased, which in turn improves the accuracy in detecting studs or other objects behind an opaque surface.

According to aspects of the present disclosure, a metal sensor, such as metal sensor 309, may include an oscillator producing an alternating current signal that passes through a coil producing an alternating magnetic field. If a metal object is close to the coil, eddy currents can be induced in the metal, and this produces a magnetic field of its own. If another coil is used to measure the magnetic field (acting as a magnetometer), the change in the magnetic field due to the metallic object can be detected.

Figure 4A:
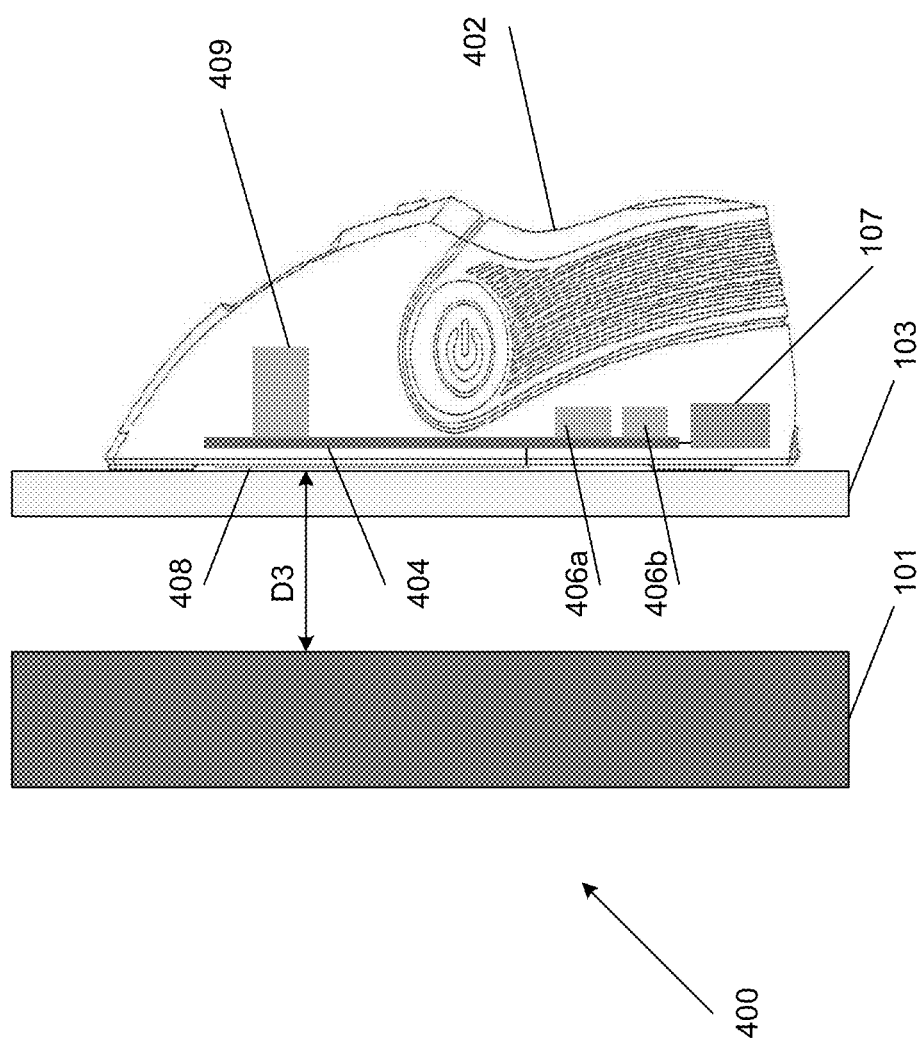
FIG. 4A illustrates a cross-sectional view of yet another exemplary implementation of a scanner for detecting objects behind an opaque surface according to aspects of the present disclosure.

FIG. 4A illustrates a cross-sectional view of yet another exemplary implementation of a scanner for detecting objects behind an opaque surface according to aspects of the present disclosure. In the exemplary implementation of FIG. 4A, certain elements of the environment 400 are similar to those of environment 300 of FIG. 3; for example, the object 101 and the opaque surface 103, and the battery 107, and therefore the description of these elements is not repeated here.

The scanner 402 may include a housing to enclose and protect various electronic components. For example, within the housing of the scanner 402, a printed circuit board (PCB) 404 may be included, which can be configured to hold the various electronic components, such as a metal sensor 409, a controller and other integrated circuits (labelled as 406a and 406b). The conductive rubber sensor(s) 408 may be placed outside of the housing of the scanner 402. With the change in placement of conductive rubber sensor(s) 408, D3 represents a distance between the conductive rubber sensor(s) 408 to the object 101 to be detected.

In the example of FIG. 4A, by taking advantage of the properties of the conductive rubber sensor(s) 408, which produces negligible interference to the metal sensor 409, the metal sensor 409 can be placed above the conductive rubber sensor(s) 408 (from the bottom perspective of the scanner 402), the lateral distance, for example shown as D4 in FIG. 3A, between the conductive rubber sensor(s) 408 and the metal sensor 409 along the PCB, can be eliminated. As a result, the size of the PCB 404 and the size of the scanner 402 can be further reduced as compared to the implementation of FIG. 3A, which in turn further reduces the material cost of the scanner 402.

Figure 4B:
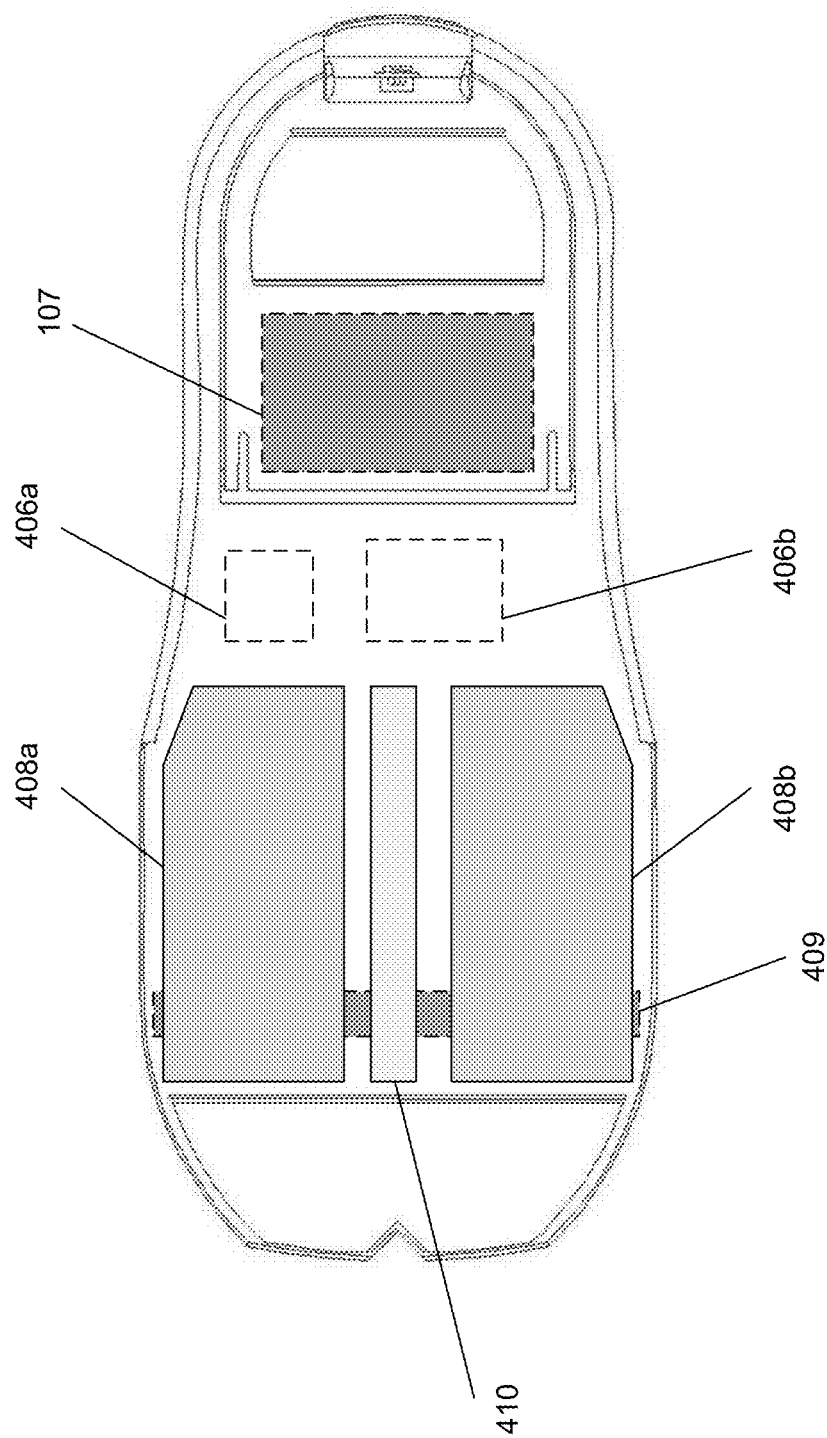
FIG. 4B illustrates a bottom view of the scanner of FIG. 4A according to aspects of the present disclosure.

FIG. 4B illustrates a bottom view of the scanner of FIG. 4A according to aspects of the present disclosure. As shown in FIG. 4B, items in solid lines represent objects in plain view from the bottom of the scanner 402, such as conductive rubber sensor(s) 408a and 408b, and an alternating current (AC) sensor 410. Items in dotted lines represent objects inside the housing of the scanner 402, such as the metal sensor 409, the controller and other integrated circuits 406a and 406b, and the battery 107. The AC sensor 410 is positioned in between the conductive rubber sensor(s) 408a and 408b, and it is configured to detect electrical wires behind the opaque surface.

By taking advantage of the properties of the conductive rubber sensor(s), which produce negligible interference to the metal sensor 409, the lateral distance, for example shown as D2 in FIG. 2, between the AC sensor 410 as well as the conductive rubber sensor(s) 408a and 408b, to the metal sensor 409 along the PCB can be eliminated. Therefore, the size and sensitivity of the conductive rubber sensor(s) 408a and 408b can be increased, which in turn improves the accuracy in detecting studs or other objects behind an opaque surface. Another advantage of placing the conductive rubber sensor(s) on the outside of the scanner is that even if the scanner is dropped, the locations of the conductive rubber sensor(s) would not be displaced with respect to the housing of the scanner. As a result, a lesser number of calibrations and higher accuracy may be achieved by the scanner.

Figure 5:
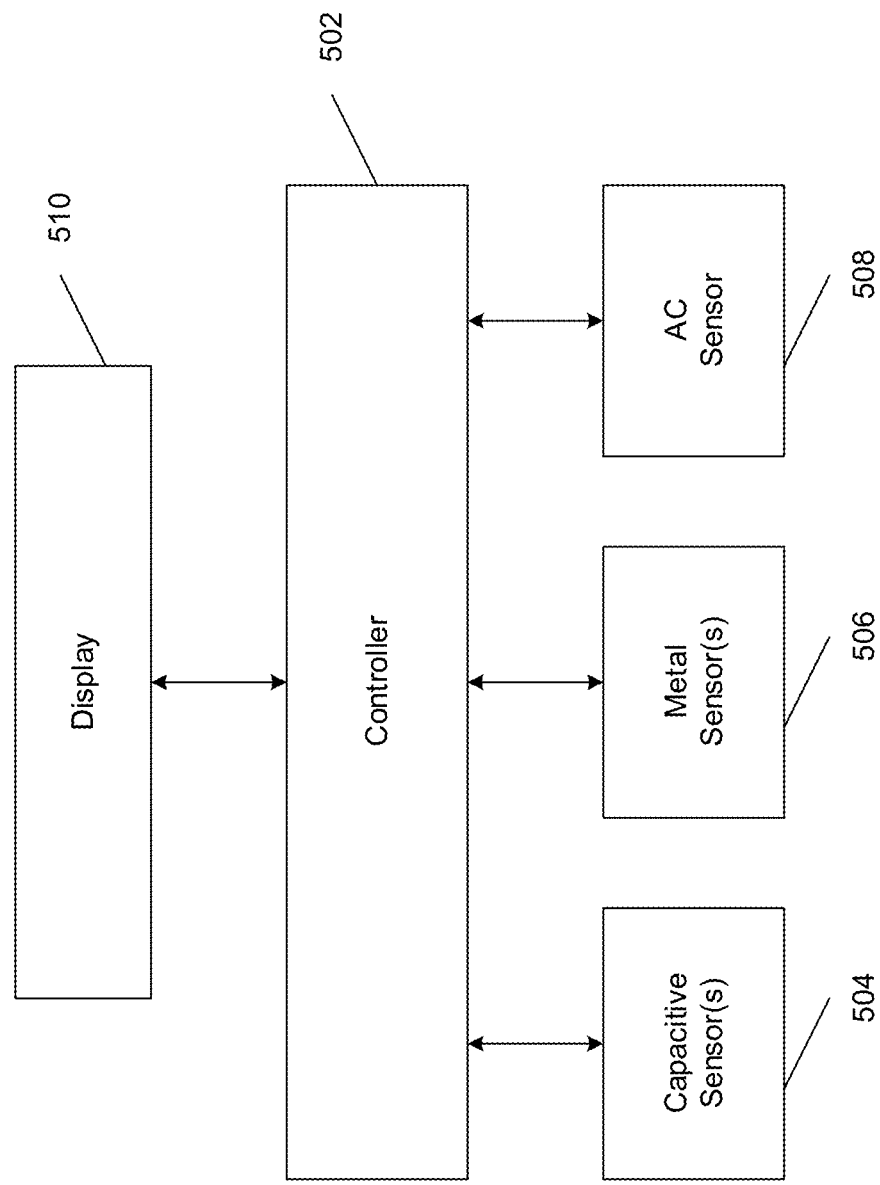
FIG. 5 illustrates a block diagram of an exemplary implementation of a scanner for detecting objects behind an opaque surface according to aspects of the present disclosure.

FIG. 5 illustrates a block diagram of an exemplary implementation of a scanner for detecting objects behind an opaque surface according to aspects of the present disclosure. In the exemplary block diagram shown in FIG. 5, a controller 502 may be configured to process sensor data collected by sensors of the scanner, namely sensor data collected by capacitive sensors 504, metal sensor 506, and alternating current (AC) sensor 508. The controller is further configured to determine information about the detected object behind the opaque surface based on the sensor data collected by capacitive sensors 504, metal sensor 506, and/or alternating current (AC) sensor 508. A display 510 is configured to provide information about the detected object(s) to a user.

Figure 6:
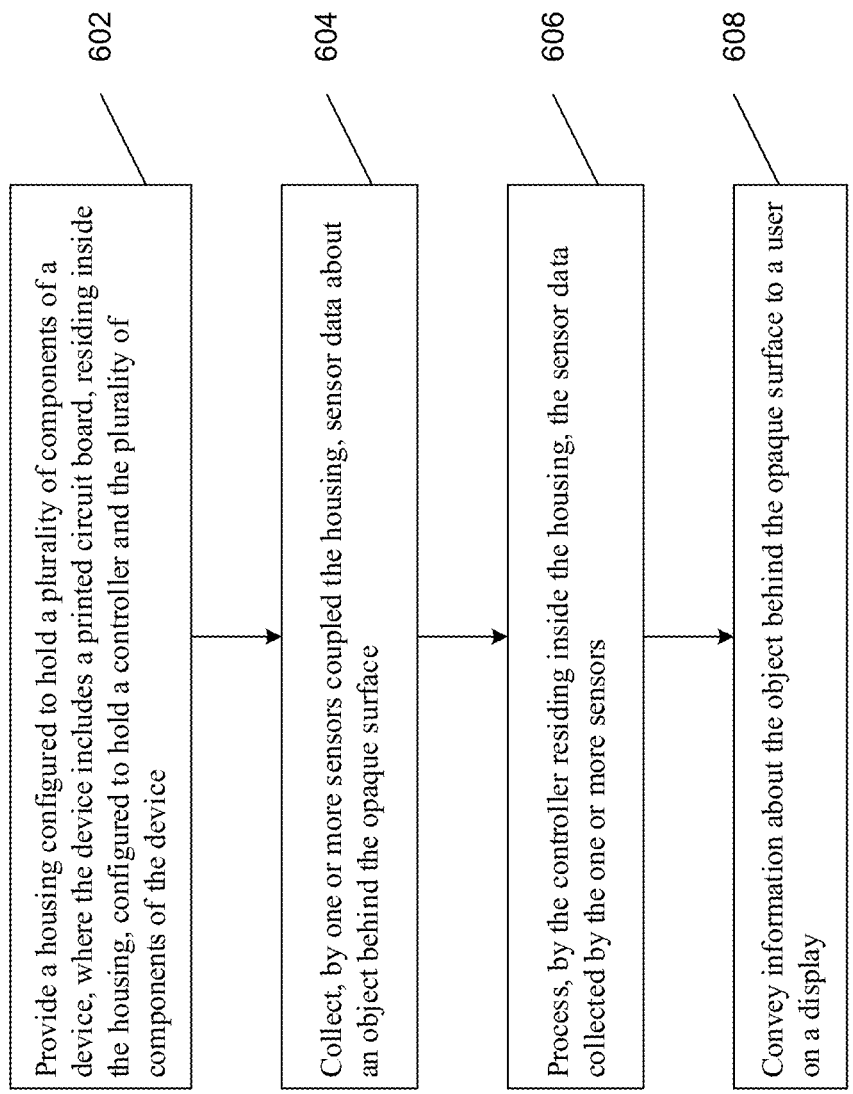
FIG. 6 illustrates a method of manufacturing of a scanner for detecting objects behind an opaque surface according to aspects of the present disclosure.

FIG. 6 illustrates an exemplary method of detecting objects behind an opaque surface according to aspects of the present disclosure. In the exemplary method shown in FIG. 6, in block 602, the method provides a housing configured to hold a plurality of components of the device, where the device includes at least one printed circuit board, residing inside the housing, that is configured to hold a controller and the plurality of components of the device. In block 604, the method collects, by one or more sensors residing outside of and/or inside the housing, sensor data of an object behind the opaque surface. In block 606, the method processes, by the controller residing inside the housing, the sensor data collected by the one or more sensors. In block 608, the method conveys information about the object behind the opaque surface to a user on a display.

In another exemplary embodiment (not shown), the information received by the processor and/or controller may be transmitted via RF/Bluetooth technology or any other similar technology known to those practicing in the art, to an independent and/or remote receiving device, that may be able to display the information and/or provide it an means accessible to the user.

According to aspects of the present disclosure, the one or more sensors, such as, for example, capacitive sensors, may be designed using different materials and forms to meet various design criteria. For example the one or more capacitive sensors can be made of: 1) conductive rubber that includes either sponge or solid silicone with nonmetallic conductive filler material, or, depending on the application, metallic conductive filler material 2) conductive rubber that is made to be in contact with the opaque surface; 3) conductive rubber that is made to cover a majority area of a bottom surface of the scanner; 4) conductive rubber that includes conductive filler imbedded into silicone; 5) waterproof material; or 6) some combinations of 1) through 5) above. In other implementations, the conductive rubber can be made such that a gap is maintained between the conductive rubber and the opaque surface. In another exemplary embodiment, the conductive rubber is placed inside the housing of the scanner.

In some implementations, the method of FIG. 6 may further include detecting, by a metal sensor residing inside the housing, a metal object behind the opaque surface, where the metal sensor may be positioned above the one or more capacitive sensors, or may be positioned on a side of the one or more capacitive sensors. The method of FIG. 6 may further include processing, by the controller, sensor data collected by sensors of the device, determining, by the controller, information about the detected object behind the opaque surface based on the sensor data collected, and providing, via the display, information about the detected object to a user.

It will be appreciated that the above descriptions for clarity have described embodiments of the invention with reference to different functional units and controllers. However, it will be apparent that any suitable distribution of functionality between different functional units or processors or controllers may be used without detracting from the invention. For example, functionality illustrated to be performed by separate processor(s) or controller(s) may be performed by the same processor(s) and/or controller(s) included with the unit. In another exemplary embodiment, functionality illustrated to be performed by the processor and/or controller or the display may be performed by an independent and/or remote receiving device, that may be able to display the information and/or provide a means accessible to the user.

Hence, references to specific functional units are to be seen as references to suitable means for providing the described functionality rather than indicative of a strict logical or physical structure or organization.

The invention can be implemented in any suitable form, including hardware, software, firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors and/or controllers.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A device for detecting objects behind an opaque surface, comprising:
   a housing configured to hold a plurality of components of the device;
   one or more sensors, coupled to the housing, configured to collect sensor data of an object behind the opaque surface, wherein the one or more sensors include one or more capacitive sensors configured to measure a change in capacitance caused by the presence of an object behind the opaque surface, wherein the one or more capacitive sensors are made of conductive rubber, and wherein the conductive rubber incorporates filler material in sponge silicone configured to reduce electromagnetic interference between an at least one metal sensor and the one or more capacitive sensors;
   a controller, residing inside the housing, configured to process the sensor data collected by the one or more sensors;
   an at least one printed circuit board, residing inside the housing, configured to hold the controller and the plurality of components of the device; and
   a display configured to convey information about a detected object to a user.

2. The device of claim 1, wherein
   the conductive rubber incorporates filler material in solid silicone configured to reduce electromagnetic interference between an at least one metal sensor and the one or more capacitive sensors.

3. The device of claim 1, wherein
   the one or more capacitive sensors reside outside of the housing.

4. The device of claim 1, wherein
   the one or more capacitive sensors reside inside the housing.

5. The device of claim 1, further comprising:
   an at least one metal sensor, residing inside the housing, configured to detect a metal object behind the opaque surface.

6. The device of claim 5, wherein
   the at least one metal sensor is positioned above the one or more capacitive sensors.

7. The device of claim 1, wherein
   the one or more sensors includes an alternating current (AC) sensor configured to detect an electric field behind the opaque surface; wherein the AC sensor is made of conductive rubber that includes filler material in either sponge or solid silicone.

8. The device of claim 1, wherein the controller is configured to:
   process sensor data collected by sensors of the device;
   determine information about the detected object behind the opaque surface based on the sensor data collected; and
   provide the information about the detected object to a user via the display.

9. A method for detecting objects behind an opaque surface by a device, comprising:
   providing a housing configured to hold a plurality of components of the device, wherein the device includes at least one printed circuit board, residing inside the housing, configured to hold a controller and the plurality of components of the device;
   collecting, by one or more sensors coupled to the housing, sensor data of an object behind the opaque surface, wherein the one or more sensors include one or more capacitive sensors configured to measure a change in capacitance caused by the presence of an object behind the opaque surface, wherein the one or more capacitive sensors are made of conductive rubber, and wherein the conductive rubber incorporates filler material in sponge silicone configured to reduce electromagnetic interference between an at least one metal sensor and the one or more capacitive sensors;
   processing, by the controller residing inside the housing, sensor data collected by the one or more sensors; and
   conveying information about the object behind the opaque surface to a user on a display.

10. The method of claim 9, wherein
    the conductive rubber incorporates filler material in solid silicone configured to reduce electromagnetic interference between an at least one metal sensor and the one or more capacitive sensors.

11. The method of claim 9, wherein
    the one or more capacitive sensors reside outside of the housing.

12. The method of claim 9, wherein
    the one or more capacitive sensors reside inside the housing.

13. The method of claim 9, further comprising:
    detecting, by an at least one metal sensor residing inside the housing, a metal object behind the opaque surface.

14. The method of claim 13, wherein
    the at least one metal sensor is positioned above the one or more capacitive sensors.

15. The method of claim 9, wherein the one or more sensors includes an alternating current (AC) sensor, further comprising:
    detecting, by the AC sensor, an electric field behind the opaque surface; wherein the AC sensor is made of conductive rubber that includes filler material in either sponge or solid silicone.

16. The method of claim 9, further comprising:
    processing, by the controller, sensor data collected by sensors of the device;
    determining, by the controller, information about the detected object behind the opaque surface based on the sensor data collected; and
    providing, via the display, information about the detected object to a user.

* * * * *